Patented Apr. 3, 1923.

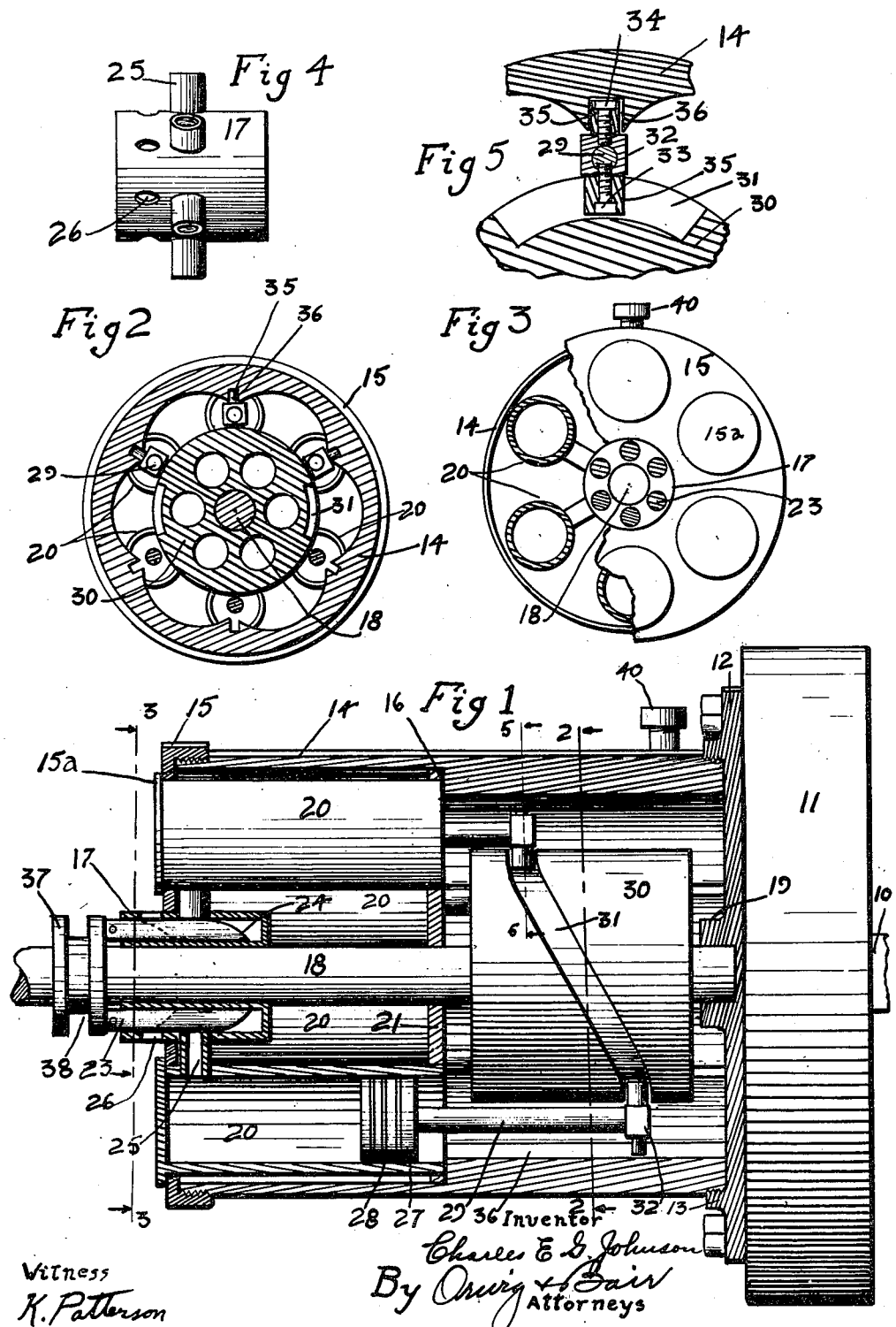

1,450,441

UNITED STATES PATENT OFFICE.

CHARLES E. G. JOHNSON, OF DES MOINES, IOWA.

PNEUMATIC CLUTCH.

Application filed January 2, 1920. Serial No. 349,112.

*To all whom it may concern:*

Be it known that I, CHARLES E. G. JOHNSON, a citizen of the United States, and a resident of Des Moines, in the county of Polk and State of Iowa, have invented a certain new and useful Pneumatic Clutch, of which the following is a specification.

The object of my invention is to provide a pneumatic clutch of simple, durable and inexpensive construction.

More particularly it is my object to provide such a clutch comprising one member which includes one or more cylinders with pistons therein, together with means for controlling the outlet of air from such cylinder, and to provide another clutch member adapted to coact with the first member, having a member operatively connected with the piston stem, and adapted to lock the clutch members together when the cylinder or cylinders are closed against the escape of air, and to permit free movement of the clutch members with relation to each other, when the cylinders are opened for the free escape of air.

With these and other objects in view my invention consists in the construction, arrangement and combination of the various parts of the device, whereby the objects contemplated are attained, as hereinafter more fully set forth, pointed out in my claim and illustrated in the accompanying drawings, in which:

Figure 1 shows a side elevation of a pneumatic clutch embodying my invention, parts of the device being shown in vertical cross section.

Figure 2 shows a detail, sectional view taken on the line 2—2 of Figure 1.

Figure 3 shows a detail, sectional view taken on the line 3—3 of Figure 1, parts of the device being shown on a vertical, sectional line through the air cylinders.

Figure 4 shows a detail view of the valve; and

Figure 5 shows a detail, sectional view taken on the line 5—5 of Figure 1.

In the accompanying drawings, I have used the reference numeral 10 to indicate generally a power shaft on which is mounted a fly wheel 11.

Fixed to the fly wheel 11 is the disc 12, having an annular flange 13 into which is screwed the cylindrical casing 14. Screwed on to the end of the casing 14 opposite the fly wheel 11, is a cap 15. Spaced inwardly from the cap 15, the casing 14 is provided on its interior with an annular shoulder 16.

A valve casing 17 is mounted within the cap 15 for rotation with the cap. Extended through the valve casing 17 is a shaft 18, one end of which is rotatably mounted in a bearing 19 on the disc 12.

Received in the left-hand end of the cylinder or casing 14, as shown in Figure 1, is a plurality of air cylinders 20, arranged in a series around the shaft 18 and spaced therefrom, as shown in Figure 1.

The cylinders 20 are screwed into the cap 15. The end of the cylinder 20 adjacent to the fly wheel is supported in a disc 21 which rests against the shoulder 16. The left-hand end of the cylinder 20, which I may call the outer end, is closed as illustrated in the lower part of Figure 1.

The right-hand end may be open. In the valve casing 17 is a plurality of longitudinal valve openings 26, in which are slidably mounted the valves 23 which are cylindrical in cross section. The inner ends of the valves 23 are bevelled as at 24.

There is provided one valve 23 for each cylinder 20. A tubular passage 25 connects each valve opening in the valve casing 17 with one of the cylinders 20, and the valves 23 are so arranged that in one of their positions, all of the passages 25 are closed while in another position of the valve all of said passages are opened. Each valve opening communicates, outside the casing 14, by means of the opening 26 with the air. When the valves 23 are in their wide open position, communication is established from the various cylinders through the passages 25, the valve openings, and the passages 26 with the outside air.

In each cylinder 20 is a piston 27 equipped with ordinary piston rings 28 and having a stem 29 extending toward the fly wheel 11.

Fixed on the shaft 18 between the cylinders 20 and the fly wheel 11 is a cylindrical cam device 30, substantially circular in cross section, as illustrated in Figure 2, and having in its exterior surface cam slot 31. On the inner end of each stem 29 is mounted a block 32. Mounted in each block 32 and extending in opposite directions are screws 33 and 34. On each of said screws is a roller 35. The rollers 35 on the screws 33 travel in the cam slot 31. The rollers 35 on the screws 34 travel in slots 36, extending longitudinally of the interior of the wall of the casing 14, which latter slots serve as guides.

The outer ends of all of the valves 23 are fixed to a collar 37 loosely mounted on the shaft 18 and provided with an annular groove 38.

I will now describe the assembling and practical operation of my improved pneumatic clutch.

The cylinders 20 may be properly assembled with relation to the disc 21 and cap 15, around the shaft 18 and with proper relation to the member 30.

The cap 15 fits against the shoulders 15ª on the cylinders 20. The parts may then be fitted to the cylinder 14, and the cylinder 14 screwed into position where it will be rigid with relation to the disc 12.

The parts are then in position for operation. Assuming that the valves 23 are in their closed position, as illustrated in Figure 1, and power is applied to the shaft 10, to the fly wheel 11, it will be seen that said fly wheel is fixed to the disc 12, and the casing 14, and when rotated will carry with it the cylinders 20. The cam slot 31 is of such shape that when the fly wheel rotates with relation to the shaft 18, and the member 30 fixed thereon, the piston 28 will be reciprocated on account of the travel of the rollers 35 on the screws 33 in said cam slot.

When, however, the valves 23 are closed, it will be seen that the rotation of the shaft 10 and the fly wheel carrying with them the casing 14 and the cylinders 20, will tend to cause the rollers 35 on the screws 33 to travel in the slot 31. There being no escape for the air in the cylinders 20, such air will resist the travel of the rollers in the slot 31 and will cause the member 30 and the shaft 18 to be rotated with the fly wheel for transmitting power from the shaft 10 to the shaft 18.

If it is desirable to release the clutch members from operative engagement with each other, the collar 37 is moved longitudinally on the shaft 18 away from the fly wheel, thereby moving the valves to their open position and permitting air to pass freely through the passages 25, the valve openings and the openings 26.

If the fly wheel continues to rotate, it will be obvious that there will be comparatively little resistance to the pistons which, therefore, will travel freely in the cylinders 20, which cylinders will travel around the shaft 18. The rollers 35 on the screws 33 will travel in the slot 31 without rotating either the member 30 or the shaft 18.

It may be mentioned that it is sometimes desirable to fill the chamber surrounding the member 30 with oil leaving enough air space therein, however, to permit the free operation of the piston. I have shown an oil filling cap 40.

Changes may be made in the construction and arrangement of the various parts of my improved pneumatic clutch without departing from the essential purposes and features of my invention, and it is my intention to cover by my claim any modified forms of structure or use of mechanical equivalents which may be reasonably included within its scope.

I claim as my invention:

In a device of the class described; a shaft; a fly wheel thereon; a flanged member formed on said fly wheel and provided with screw-threads; a cylinder having a screw-threaded end screwed into said flange; a screw-threaded cap for the opposite end of said cylinder; a plurality of cylinders mounted in said first cylinder in a series in a circle; a second shaft aligned with said first shaft and extending through said first cylinder; a member on said second shaft having a cam slot in its outer surface; pistons in said second described cylinders; stems on said pistons; and members on said stems received in said cam slot; a valve casing rotatably mounted on said second shaft; valve controlled passages in said valve casing communicating with the respective cylinders; and a valve device for controlling the various valve openings.

Des Moines, Iowa, December 11, 1919.

CHARLES E. G. JOHNSON.